(12) United States Patent
Lee et al.

(10) Patent No.: US 12,248,057 B2
(45) Date of Patent: Mar. 11, 2025

(54) METHOD FOR PROVIDING SERVICE RELATED TO ELECTRONIC DEVICE BY FORMING ZONE, AND DEVICE THEREFOR

(71) Applicant: Samsung Electronics Co., Ltd., Gyeonggi-do (KR)

(72) Inventors: Woosup Lee, Gyeonggi-do (KR); Sungnam Kang, Gyeonggi-do (KR); Soon Park, Gyeonggi-do (KR); Haekwon Lee, Gyeonggi-do (KR); Woongeun Kwak, Gyeonggi-do (KR); Sehwan Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 520 days.

(21) Appl. No.: 17/560,591

(22) Filed: Dec. 23, 2021

(65) Prior Publication Data

US 2022/0113395 A1  Apr. 14, 2022

Related U.S. Application Data

(63) Continuation of application No. PCT/KR2020/004451, filed on Apr. 1, 2020.

(30) Foreign Application Priority Data

Jun. 26, 2019 (KR) .................. 10-2019-0076324

(51) Int. Cl.
*G01S 13/66* (2006.01)
*G01S 13/04* (2006.01)
(Continued)

(52) U.S. Cl.
CPC .............. *G01S 13/66* (2013.01); *G01S 13/04* (2013.01); *G06F 3/017* (2013.01); *H04W 4/80* (2018.02); *H04W 4/70* (2018.02)

(58) Field of Classification Search
None
See application file for complete search history.

(56) References Cited

U.S. PATENT DOCUMENTS 9,924,880 B2   3/2018   Kim et al.
10,628,714 B2  4/2020   Pradeep et al.
(Continued)

FOREIGN PATENT DOCUMENTS

KR   10-2008-0037599 A   4/2008
KR   10-2010-0136659 A   12/2010
(Continued)

OTHER PUBLICATIONS

KR1020100136659 machine translation (Year: 2010).*
Korean Office Action dated Oct. 2, 2024.

*Primary Examiner* — Whitney Moore
(74) *Attorney, Agent, or Firm* — Cha & Reiter, LLC

(57) ABSTRACT

Disclosed are a method for controlling an electronic device by forming a zone, and a device therefor. A method for providing a service related to an electronic device by using a master device in a zone, according to the present disclosure, may include the operations of: checking whether a user exists in the zone by using radar; tracking the movement of the user in the zone if the existence of the user is confirmed; and providing a service related to the electronic device to the user, where the electronic device is included in the determined zone so as to be controlled by the master device.

20 Claims, 11 Drawing Sheets

(51) Int. Cl.
  *G06F 3/01* (2006.01)
  *H04W 4/70* (2018.01)
  *H04W 4/80* (2018.01)

(56) References Cited

U.S. PATENT DOCUMENTS

2012/0058783 A1  3/2012  Kim et al.
2016/0037298 A1  2/2016  Park et al.
2016/0098089 A1  4/2016  Poupyrev
2016/0162980 A1  6/2016  Oldre
2016/0352784 A1  12/2016  Oh
2017/0328997 A1  11/2017  Silverstein et al.

FOREIGN PATENT DOCUMENTS

KR  10-2012-0024247 A  3/2012
KR  10-2016-0015668 A  2/2016
KR  10-1635200 B1  6/2016
KR  10-2016-0140185 A  12/2016
KR  10-2017-0007472 A  1/2017
KR  10-1734398 B1  5/2017
KR  10-2018-0105174 A  9/2018
KR  10-1999712 B1  7/2019

* cited by examiner

METHOD FOR PROVIDING SERVICE RELATED TO ELECTRONIC DEVICE BY FORMING ZONE, AND DEVICE THEREFOR

CROSS-REFERENCE TO RELATED APPLICATION(S)

This application is a Continuation of and based on and claims priority under 35 U.S.C. § 120 to PCT International Application No. PCT/KR2020/004451, which was filed on Apr. 1, 2020, and claims priority to Korean Patent Application No. 10-2019-0076324, filed on Jun. 26, 2019, in the Korean Intellectual Property Office, the disclosures of which are incorporated by reference herein their entirety.

BACKGROUND

Technical Field

One or more embodiments of the instant disclosure generally relate to a method for providing a service related to an electronic device by forming a zone, and a device therefor.

Description of Related Art

Due to the development of wireless communication technology, various devices capable of performing communication can communicate with one another to form a network, so that these devices can be conveniently controlled. As such, connecting devices via a network by adding communication functions to these devices is referred to as Internet of Things (IoT), and IoT have been increasingly deployed in the art.

In order to implement IoT, various technologies, such as sensing technology, wired/wireless communication and network infrastructure, service interface technology, and security technology, have been required, and therefore technologies, such as sensor network, machine-to-machine (M2M) communication, and machine-type communication (MTC) for connection between things, have been recently studied.

IoT environments may provide intelligent Internet technology services that create value for human users by collecting and analyzing data generated by the connected devices. IoT may be applied to various fields, such as smart homes, smart buildings, smart cities, smart cars or connected cars, smart grids, health care, smart home appliances, and advanced medical services, via convergence and combination between existing IT technologies and various industries.

SUMMARY

As the number of electronic devices having communication function increases and functions thereof diversify, and in order to control these various electronic devices, a separate electronic device capable of communicating with these electronic devices may be required. However, the user may not necessarily carry such a controlling device, for example a mobile terminal, while he or she is at a particular place, for example the home. If the user has to carry a mobile terminal or the like to control the electronic devices, this may cause further inconvenience.

According to the disclosure, a method for providing a service relating to an electronic device by using a master device within a zone includes determining whether a user is present within the zone by using radar, tracking movement of the user within the zone if the presence of the user is determined, and providing the user with the service relating to the electronic device, wherein the electronic device is included in the determined zone so as to be controlled by the master device.

According to the disclosure, a master device configured to provide a service relating to an electronic device within a zone includes a radar communication module, a short-range communication module, and a controller configured to determine whether a user is present within the zone by using the radar communication module, track movement of the user within the zone if the presence of the user is determined, and provide the user with the service relating to the electronic device, wherein the electronic device is included in the zone so as to be controlled by the master device.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

According to one or more embodiments disclosed herein, a service relating to an electronic device can be provided to a user by determining the location of the user. The service relating to the electronic device may be a service necessary for the user, in addition to a service based on the user's command. Even if the user moves, the service can be provided without interruption.

Hereinafter, certain embodiments of the document will be described with reference to the accompanying drawings.

Figure 1:
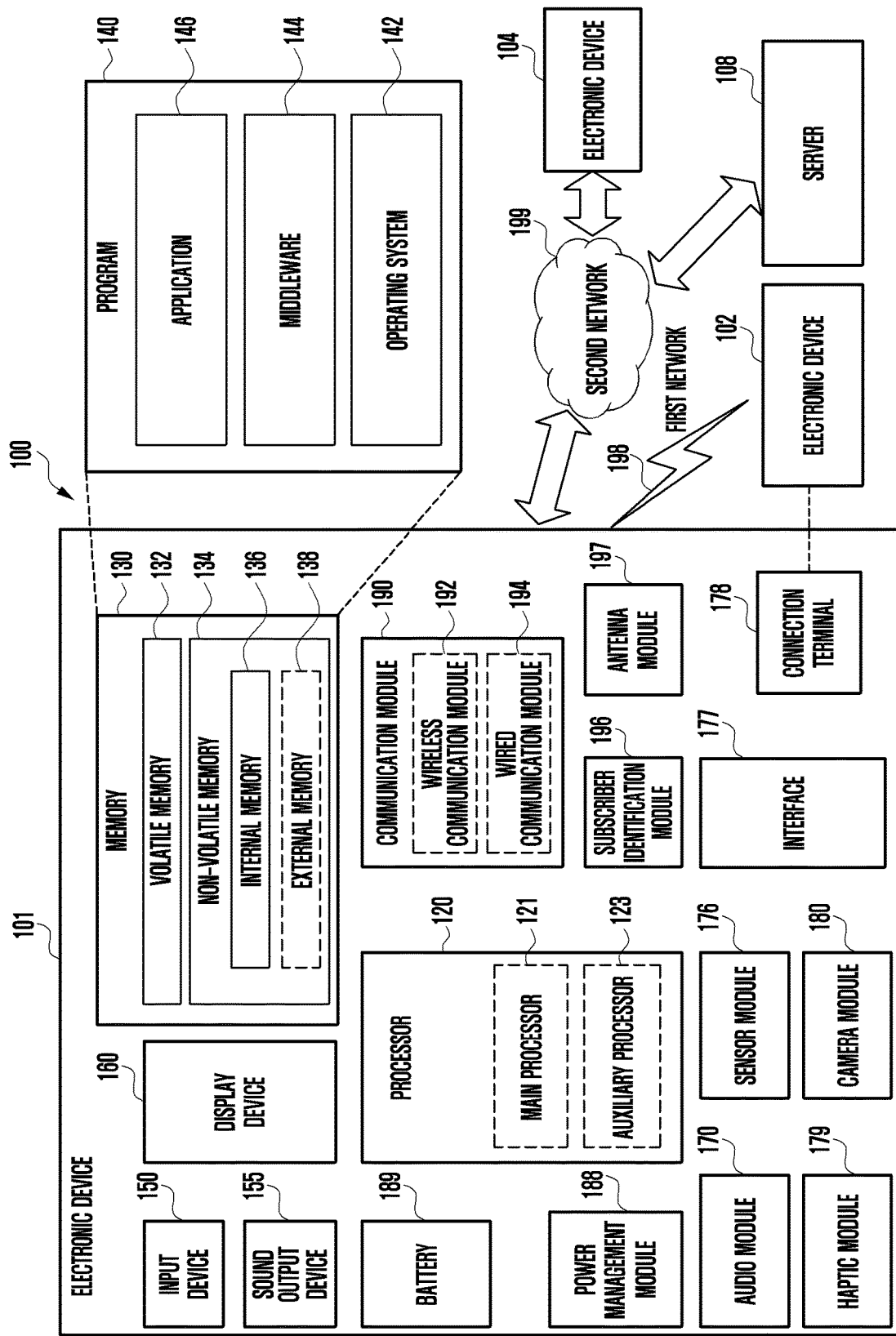
FIG. 1 is a block diagram of an electronic device 101 within a network environment 100 according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
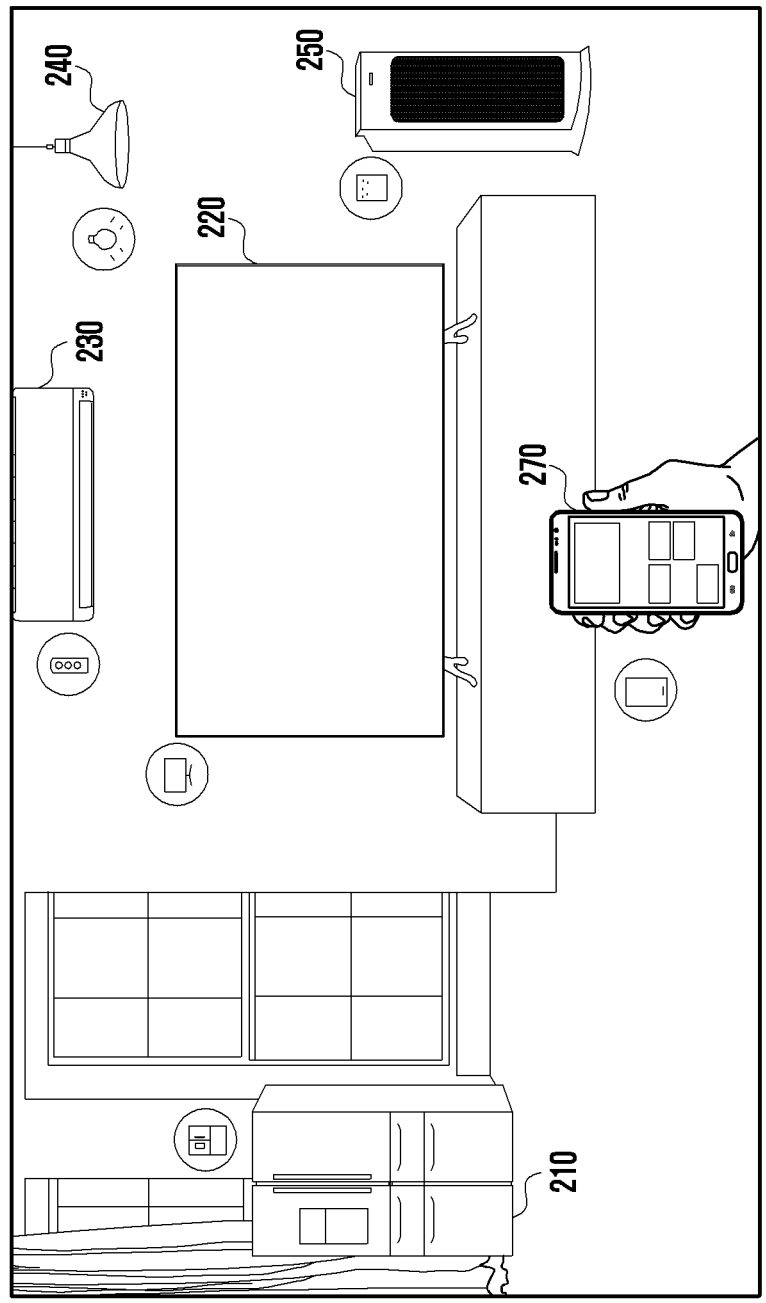
FIG. 2 is a diagram illustrating a state in which a user controls IoT devices by using a mobile terminal.

FIG. 2 is a diagram illustrating a state in which a user controls IoT devices by using a mobile terminal.

Multiple IoT devices, i.e., electronic devices, are disposed in a house. Referring to FIG. 2, a refrigerator 210, a TV 220, an air conditioner 230, a light 240, an air purifier 250, a washing machine (not shown), a robotic cleaner (not shown), etc. may be disposed in the house, and if each of the devices includes communication function, the devices may be controlled by a mobile terminal 270. For example, the user may turn on or off the light 240 by using the mobile terminal 270 instead of using a switch attached on a wall, and may identify food ingredients in the refrigerator 210 by using the mobile terminal 270. The user may receive a notification in real time from the washing machine when laundry is finished and may also receive, from the robotic cleaner, a message indicating that floor needs to be cleaned, via the mobile terminal 270. In addition, the user may identify a visitor by using the mobile terminal 270, the TV 220, the refrigerator 210 monitor, or the like, and may transmit a photo stored in the mobile terminal 270 to family via various monitors.

Figure 3:
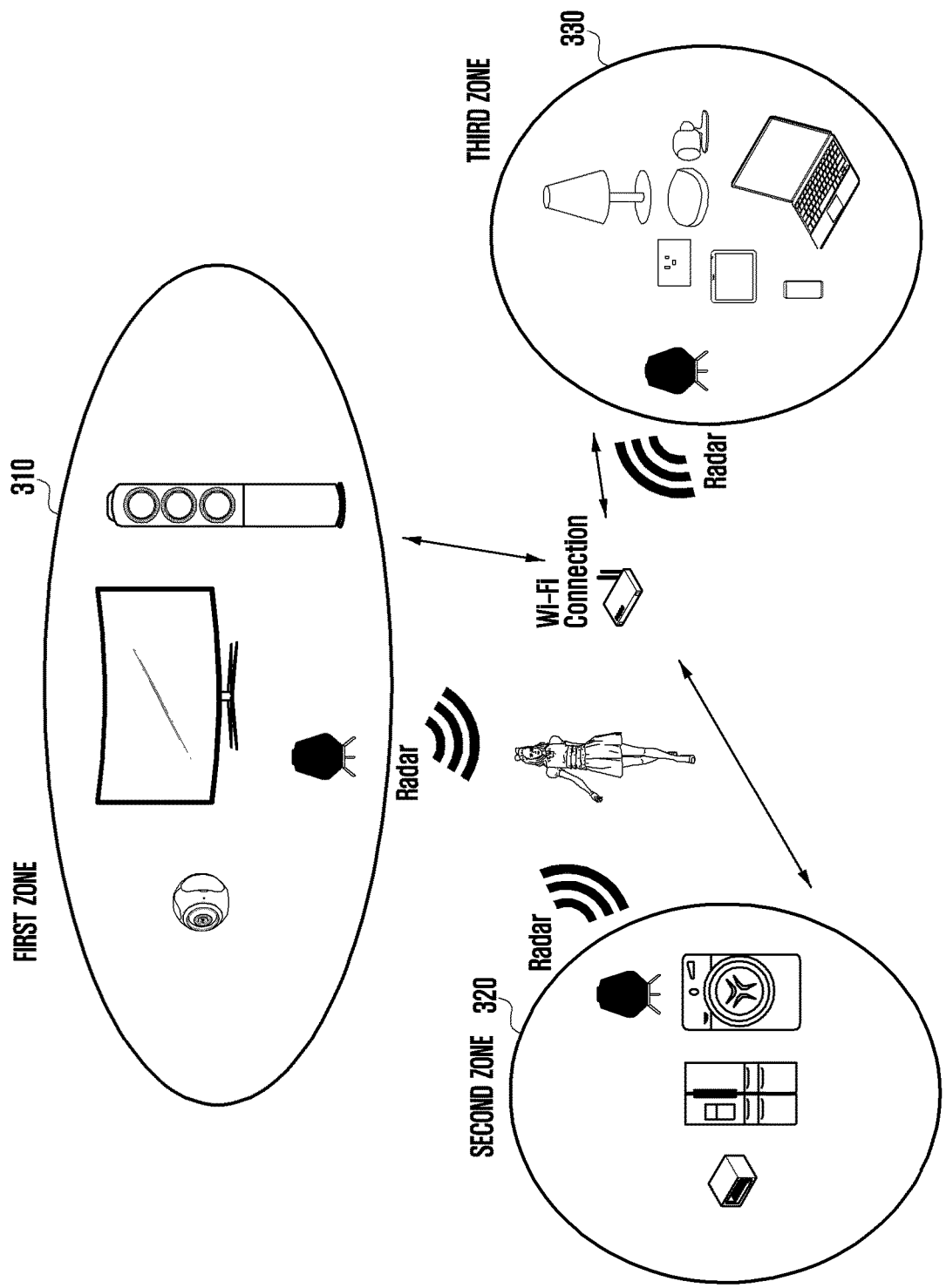
FIG. 3 is a diagram illustrating zones formed to control multiple IoT devices according to an embodiment of the disclosure.

FIG. 3 is a diagram illustrating zones formed to control multiple IoT devices according to an embodiment of the disclosure.

Referring to FIG. 3, in places where multiple IoT devices are disposed is the house, for example the living room, kitchen, and bedroom may each be classified as a zone. Each zone may include one master device having a radar. In FIG. 3, an artificial intelligence (AI) speaker is used an example of the master device. The AI speaker may receive speech of the user via a microphone (Mic), and may determine, using a radar, whether the user is present. The AI speaker may determine an IoT device that is close to the user by using the volume of the received voice and/or the radar, and may provide a requested service to the user. For example, if the AI speaker uses the radar, an IoT device close to the user may be determined using a 60 GHz radar channel impulse response (CIR) equation.

In the disclosure, a zone may refer to an area including adjacent IoT devices around the master device (AI speaker in FIG. 3) or an area including IoT devices controllable by the master device. Alternatively, the zone may be an area detectable by the radar of the master device. In FIG. 3, the first zone 310 may be a living room including a TV, an air conditioner, and a robotic cleaner in addition to a first AI speaker (shown in black in FIG. 3) that is the master device. The second zone 320 may be a kitchen including a refrigerator, a washing machine, and a microwave oven in addition to a second AI speaker that is the master device, and a third zone 330 may be a room including a mobile phone, a laptop computer, a tablet PC, etc. in addition to a third AI speaker that is the master device. IoT devices included in each zone may communicate with each other using various communication methods (e.g., Wi-Fi, etc.) and may also communicate with the master device in a different zone.

The master devices located in the respective zones may determine, using the radar, whether the user is present in the zones, and if it is determined that the user is present, the master devices may provide various services. The master devices located in the respective zones may track the user's movement so as to seamlessly provide services to the user.

In the above, the description has been provided by taking the house as an example, but it is not necessarily limited to the house, and application can be made to any place where master device(s) and IoT devices are installed.

Hereinafter, an embodiment according to the disclosure will be described in more detail.

As described above, the master device may include a microphone for communication with the user, and in this case, the master device may receive speech commands of the user. The number of master devices capable of receiving speech commands of the user may vary according to the number of zones, the sizes of the zones, and the speech volume of the user. If the master device having received the speech command of the user responds, multiple master devices may respond or none of the master devices may respond. Alternatively, a responding master device may be determined according to the volume of received speech, and this may also cause a problem. This is because the volume of speech received by the master device may vary depending on the location of the master device, the presence or absence of obstacles, or the like.

To solve this problem, the master device may include a radar capable of measuring the distance from the user. Furthermore, the master device may track the user by using the radar and may determine the zone in which the user is located. If only one master device is tracking the user, the single master device may respond to the speech command of the user. If multiple master devices are tracking the user, a master device closest to the user may respond to the speech command of the user. In this case, the multiple master devices may share information of the measured distances from the user via communication. Alternatively, it may be configured that the master device within a certain distance from the user may respond.

Figure 4:
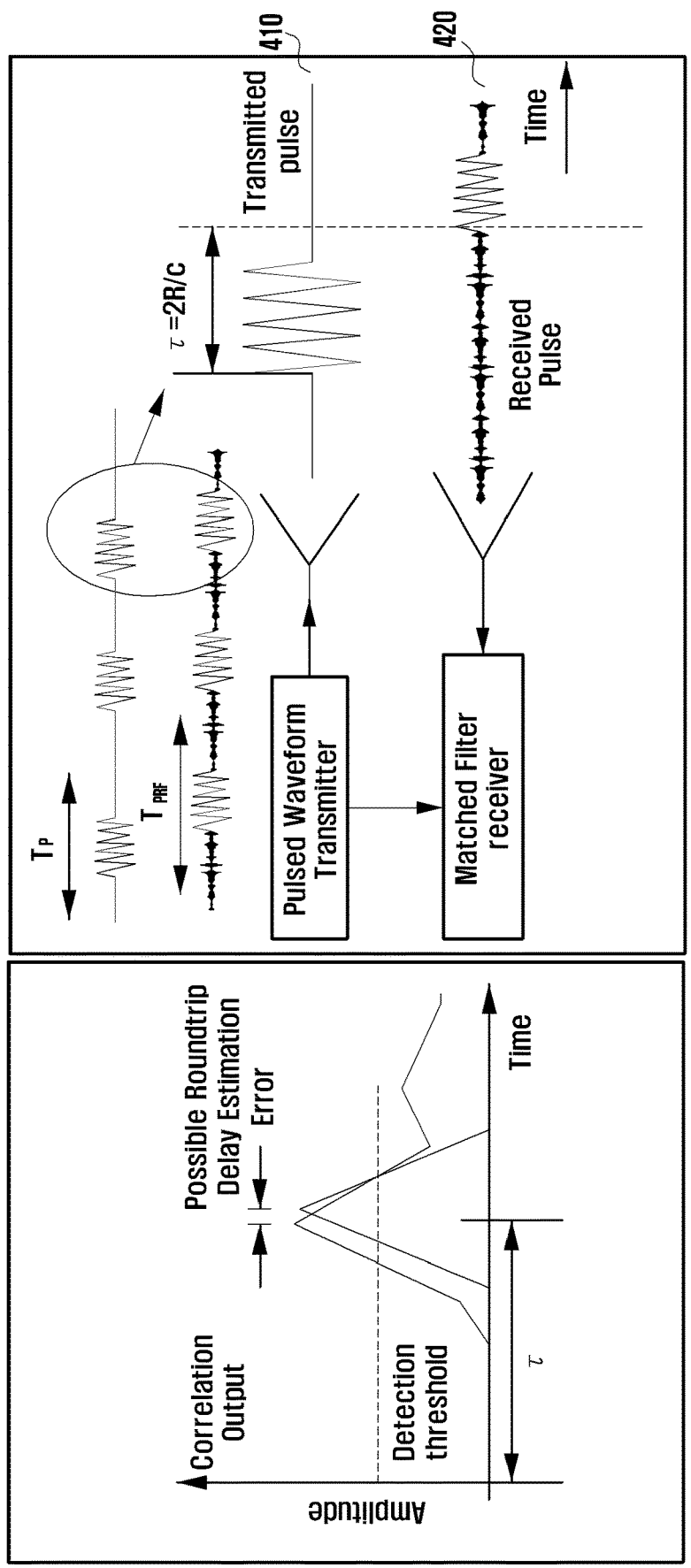
FIG. 4 is a diagram illustrating an operation principle of a master device measuring a distance from a user using a radar, as an example of the disclosure.

FIG. 4 is a diagram illustrating an operation principle of a master device measuring a distance from a user using a radar, as an example of the disclosure.

The master device may transmit 410 pulses and may receive the reflected pulses 420. By using the received pulses, the master device may measure and determine the distance to a reflected object, whether the reflected object is person, i.e., the user, whether the user moves if the reflected object is the user, and the like.

That is, the master device may determine the location of the user present within a zone, by measuring the distance from the user by means of a radar. If the user is determined to be located within the zone, the master device may track the user by using the radar.

Hereinafter, a mode in which a master device senses and tracks the user by using a radar will be described.

The master device may use the radar to sense whether a user is present within a zone, and this may be referred to as a sensing mode. For example, the master device may determine, at a relatively low cycle (e.g., 10 to 50 fps), whether there is a nearby user, by using at least one of a small number of patches (1 to 5), a half patch, and a dipole antenna. The master device may make the determination of a person by using a phase characteristic of a reflected signal.

If the master device determines, in the sensing mode, that the user is present, the master device may track the user by using the radar, and this may be referred to as a tracking mode. For example, the master device may track the user at a cycle (e.g., 30 to 100 fps) higher than that of the sensing mode by using at least one of multiple (1 to 20) patches, a half-patch, and a dipole antenna. In this case, beamforming may be performed with an array antenna, and multiple users may be concurrently tracked. This tracking mode may be continuously performed at short periods in order to sense and identify the location of the user and provide quick responses to the user. The radar used in the sensing mode and the radar used in the tracking mode are not necessarily the same. Even if the same radar is used, the radar may be used differently.

As another embodiment, if the user is located at an edge of a zone or at an overlapping part of two zones, the master devices of both zones may track the user.

As another embodiment, if the user moves out of a zone, the master device of the zone, from which the user has been departed, may be switched back to the sensing mode.

Hereinafter, a service that a master device can provide to the user will be described in detail. The service may include providing information relating to an electronic device, controlling the electronic device by using a gesture, controlling the electronic device by using a mobile terminal, and the like.

Figure 5:
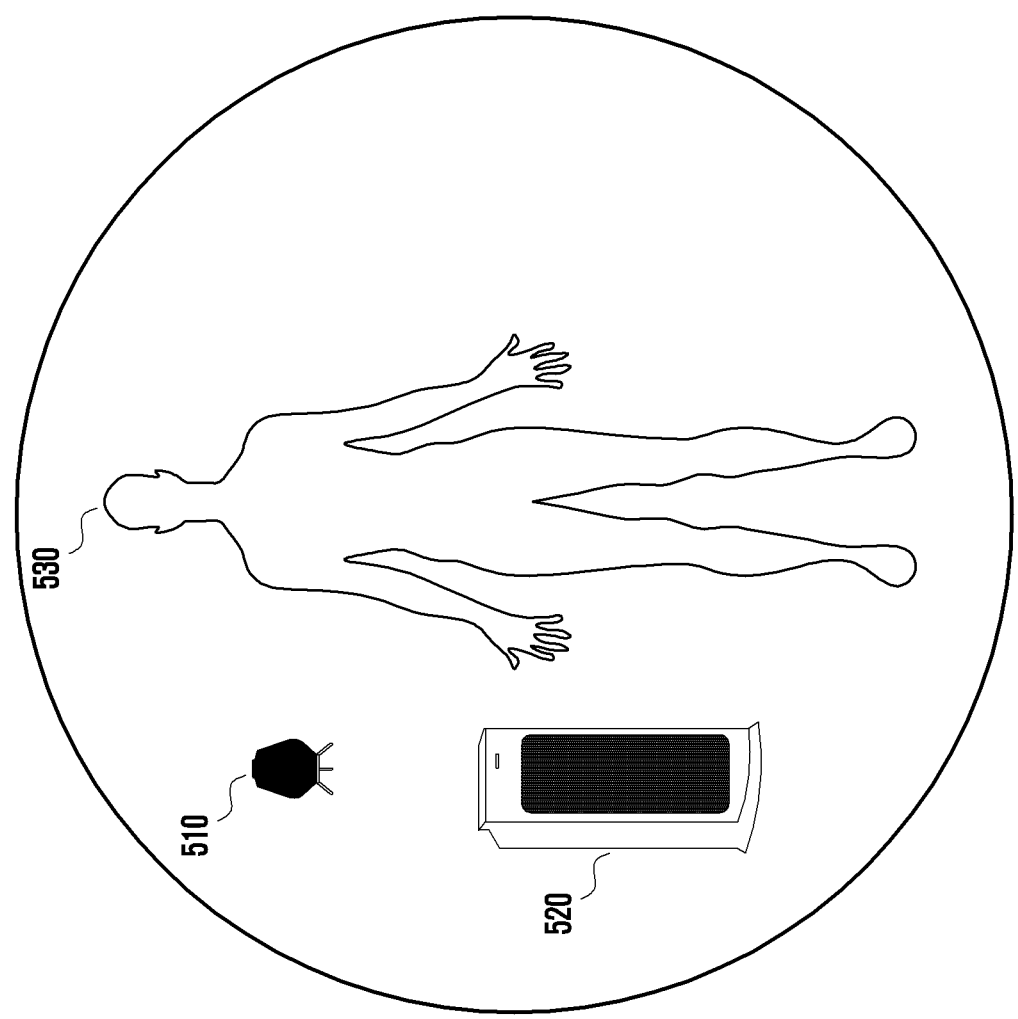
FIG. 5 is a diagram illustrating an example of providing information relating to an electronic device within a zone, as the service provided by a master device according to an embodiment of the disclosure.

FIG. 5 is a diagram illustrating an example of providing information relating to an electronic device within a zone, as the service provided by a master device according to an embodiment of the disclosure.

The electronic device may be, for example, an air purifier 520, and the air purifier 520 may be included in the zone controlled by the master device 510. The master device 510 may sense whether the user 530 enters the zone and may track the user 530 when the user 530 enters the zone. If the user 530 is located around the air purifier 520, that is, within a certain radius, the master device 510 may inform the user 530 of information relating to the air purifier 520. For example, the master device 510 may inform information about a filter replacement period of the air purifier 520. The master device 510 may notify the user via speech or by using a lamp of the air purifier 520, or the like. As another example, if a refrigerator is located in the zone, the master device may notify the user of information on food with imminent expiration via speech or via a monitor of the refrigerator. That is, the master device may provide the user with a service related to the electronic device included in the zone, even without any command from the user, just based on that the user enters the zone or the electronic device is located within a certain radius.

Figure 6:
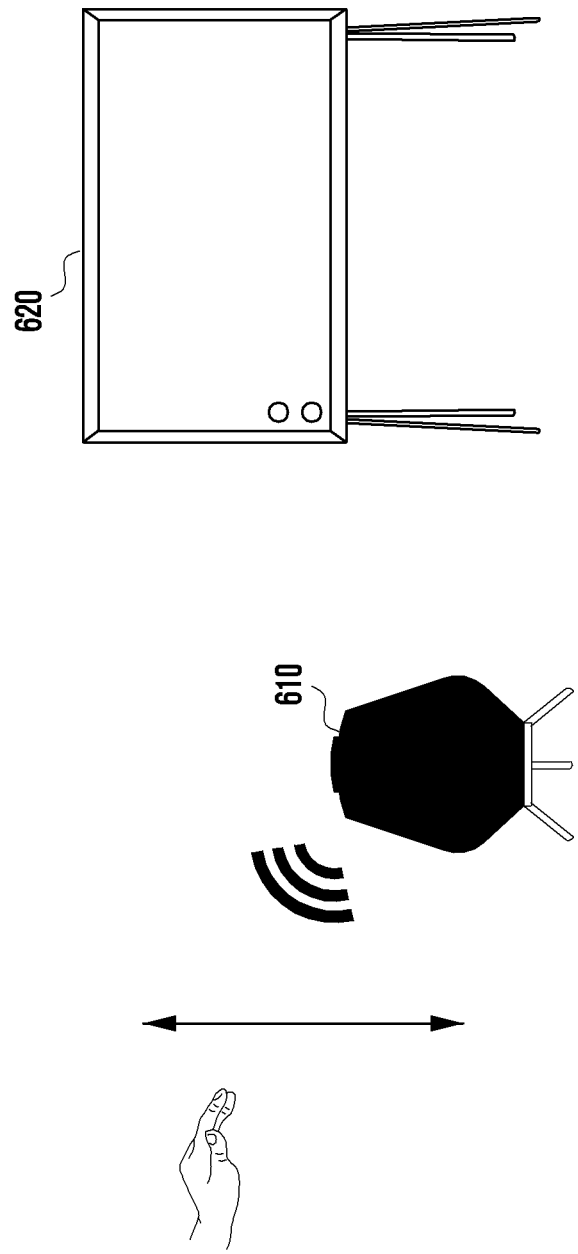
FIG. 6 is a diagram illustrating an example of controlling an electronic device within a zone by using a gesture, as a service provided by a master device according to an embodiment of the disclosure.

FIG. 6 is a diagram illustrating an example of controlling an electronic device within a zone by using a gesture, as a service provided by a master device according to an embodiment of the disclosure.

In FIG. 6, the electronic device may be a TV 620, and the TV 620 may be included in a zone controlled by a master device 610. The master device 610 may sense whether the user enters the zone and may track the user when the user enters the zone. According to the FIG. 5 embodiment, if the user is located near the TV 620, the master device 610 may inform the user of information relating to TV 620 (e.g., currently airing program, etc.). In this embodiment, the user may control the TV 620 by using his/her hand. For example, in this embodiment, when the user moves his/her hand up or down, the master device 610 may increase or decrease the volume of the TV 620. The user may change the channel of the TV 620 by moving his/her hand left and right. As another example, if an air conditioner is located in the zone, the user located around the air conditioner may also control the air conditioner by using the same gesture (e.g. lower or raise temperature).

Figure 7:
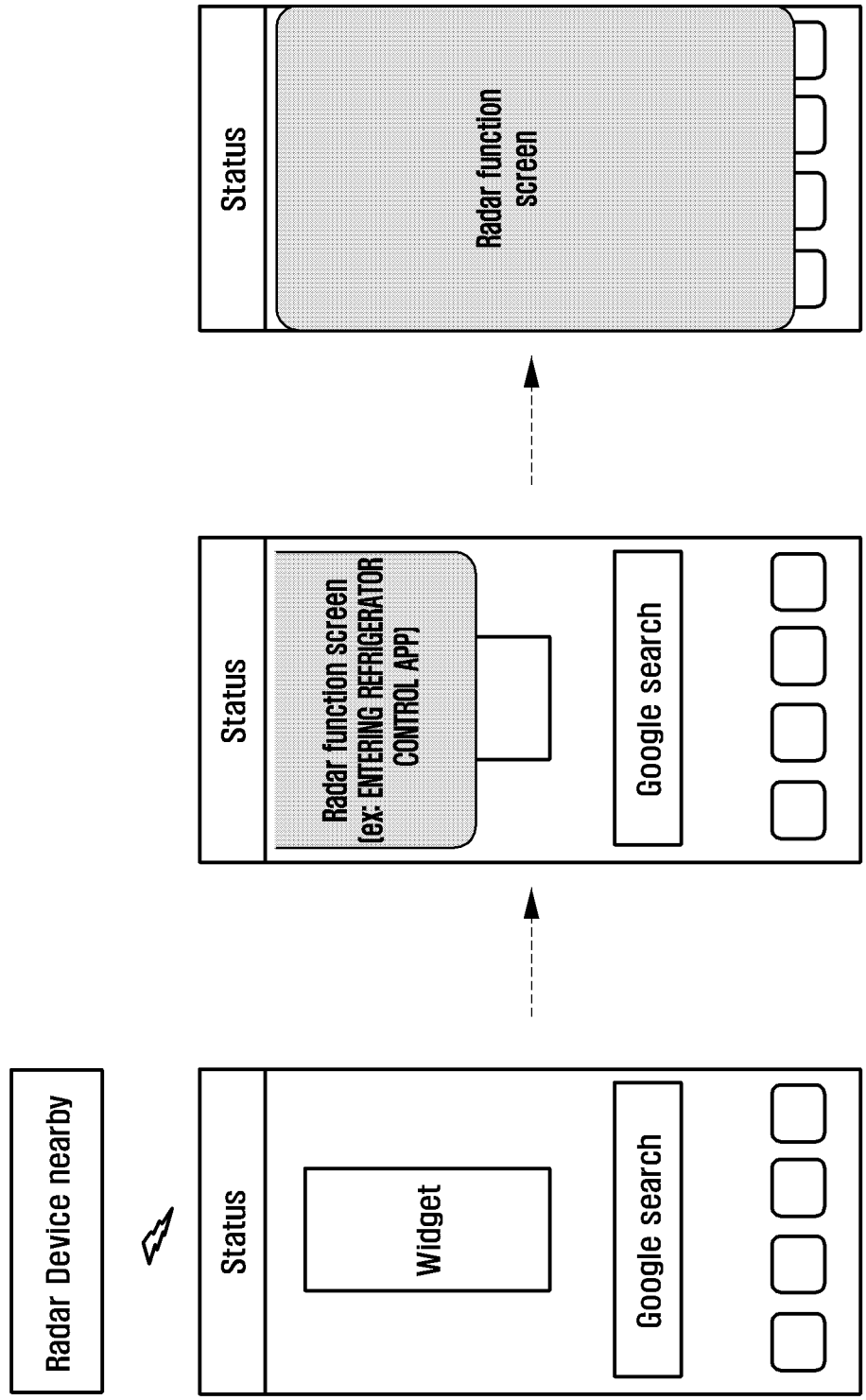
FIG. 7 is a diagram illustrating an example of controlling an electronic device by using a mobile terminal, as a service provided by a master device according to an embodiment of the disclosure.

FIG. 7 is a diagram illustrating an example of controlling an electronic device by using a mobile terminal, as a service provided by a master device according to an embodiment of the disclosure.

When a user carrying a mobile terminal enters a zone, the master device may execute an application related to a controllable electronic device, which is installed in the mobile terminal, or may provide a function screen for execution of the application. The controllable electronic device is an electronic device which is located in the zone so as to be controllable by the master device, and there may be multiple electronic devices.

FIG. 7 specifically illustrates a state in which, when a refrigerator is located in the zone, and the user carrying the mobile terminal moves to be near the refrigerator, a pre-installed application capable of controlling the refrigerator is executed in the mobile terminal.

Hereinafter, a method of zone configuration for sensing the user and registration of an electronic device to be controlled by a master device according to the disclosure will be described.

Figure 8:
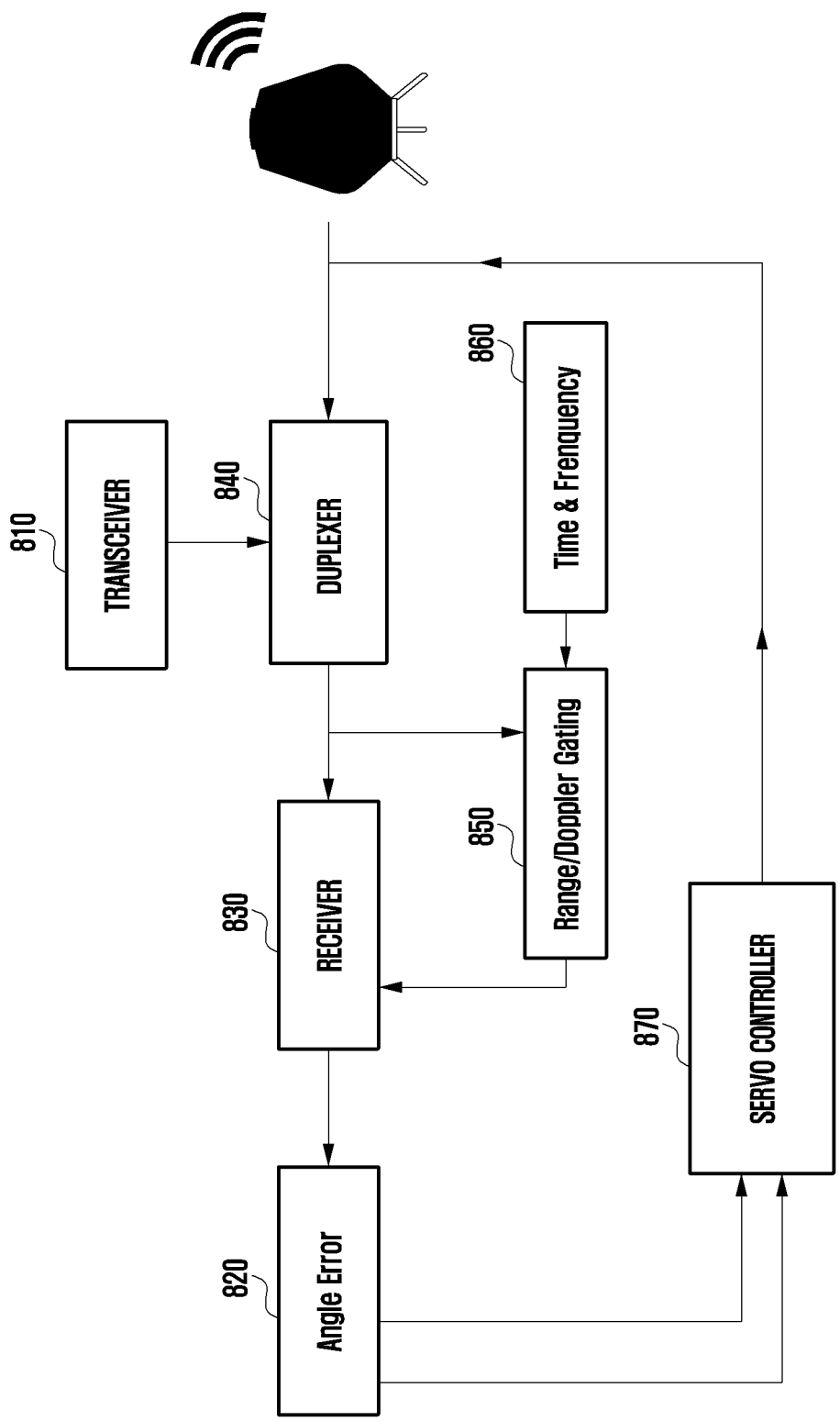
FIG. 8 is a diagram illustrating an example of an internal configuration diagram of a master device according to an embodiment of the disclosure.

FIG. 8 is a diagram illustrating an example of an internal configuration diagram of a master device according to an embodiment of the disclosure.

Specifically, in FIG. 8, the master device may include a transmitter or transceiver 810, a receiver 830, a duplexer 840, and a servo controller 870.

The transmitter 810 may transmit radar signals by using the duplexer 840, and the receiver 830 may receive radar signals by using the duplexer 840. The duplexer 840 may switch some of its configurations depending on whether the master device transmits or receives the radar signal.

When the duplexer 840 receives a radar signal and transmits the radar signal to a range/Doppler gating 850, the range/Doppler gating 850 may receive a transmission/reception time and frequency information from a time & frequency 860 so as to perform distance and Doppler gating.

The receiver 830 may transfer, to an angle error 820, the information received from the range/Doppler gating 850 in order to determine an error for an angle.

The servo controller 870 may control a mode of the master device, etc., based on the error information received from the angle error 820.

Although the description has been made for the specific configuration of FIG. 8, the angle error 820, the range/Doppler gating 850, the time & frequency 860, the servo controller 870, etc. may be configured as a single controller. The transmitter 810, the receiver 830, and the duplexer 840 are separately described, but may be also configured as a single transceiver.

Although the description has been provided in FIG. 8 such that operations are performed by elements differing from those in FIG. 1, but operations may be performed by the elements of FIG. 1, for example, the processor 120 and the communication module 190. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

A first method of registering an electronic device controllable by the master device is to directly register the electronic device in the master device by the user. For example, if a TV, air conditioner, and robotic cleaner are located around a first master device, the user may directly register the TV, the air conditioner, and the robotic cleaner in the first master device.

A second method of registering an electronic device controllable by the master device is to register an electronic device located within a certain distance from the master device by using a function of the master device. The function of the master device may be a Wi-Fi aware P2P ranging function.

Figure 9:
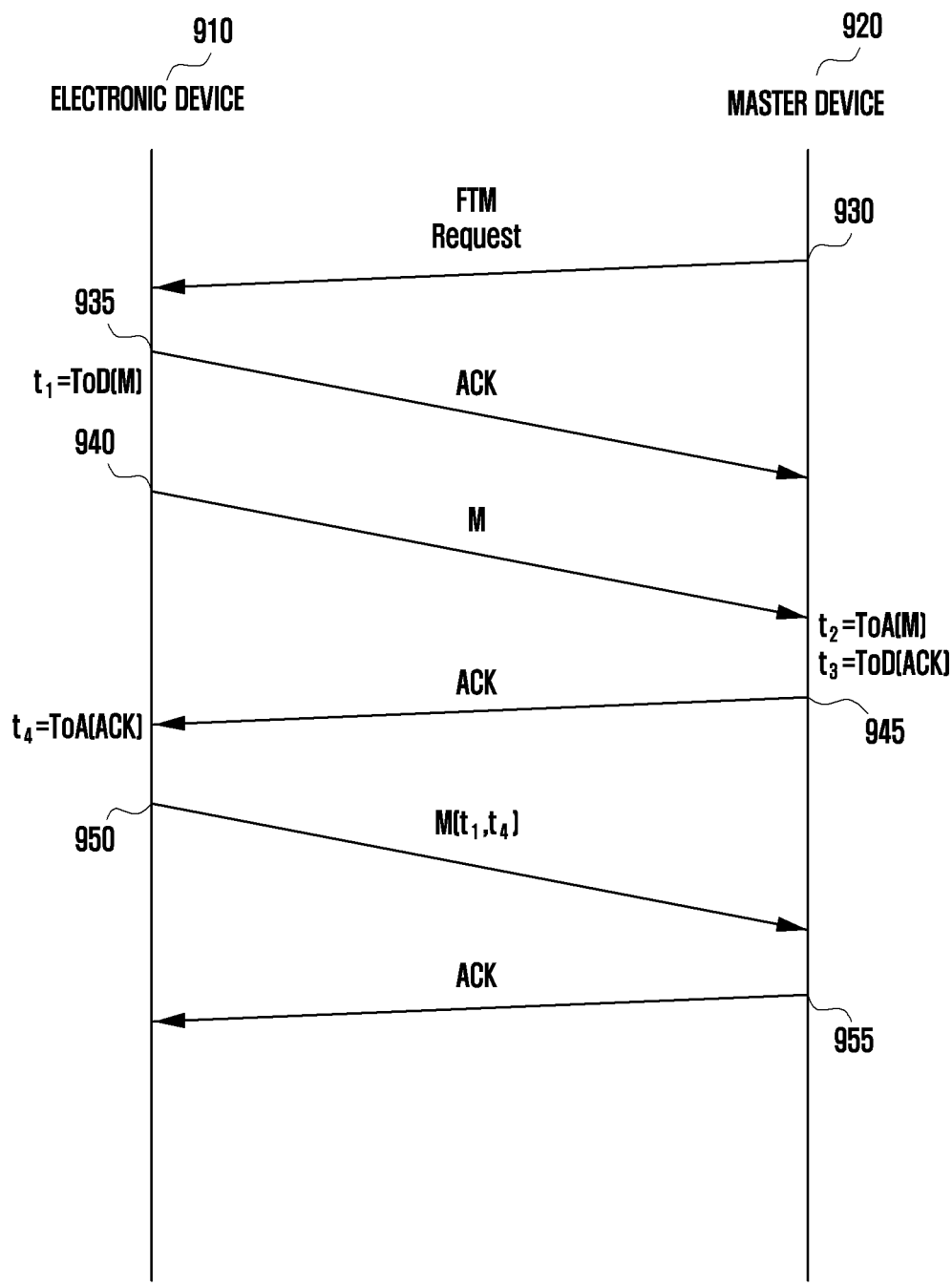
FIG. 9 is a sequence diagram in which a master device registers an electronic device by using a Wi-Fi aware P2P ranging function according to an embodiment of an embodiment of the disclosure.

FIG. 9 is a sequence diagram in which a master device registers an electronic device by using a Wi-Fi aware P2P ranging function according to an embodiment of the disclosure.

A master device 920 may transmit at step 930 a fine timing measurement (FTM) request to an electronic device 910 so as to measure the distance.

The electronic device 910 may transmit at step 935 ACK for the FTM request to the master device 920 in response.

The electronic device 910 may transmit at step 940 a message (M) for notifying a start of distance measurement. The electronic device 910 identifies a transmission time $t_1$ of the message (ToD, time of delivery), and the master device 920 identifies a time $t_2$ at which the message is received (ToA, time of arrival).

The master device 920 may transmit at step 945 ACK for the message to the electronic device 910. The master device 920 identifies a transmission time $t_3$ of the ACK, and the electronic device 910 identifies a time $t_4$ at which the message is received.

The electronic device 910 may transmit at step 950, to the master device 920, the time $t_1$ at which the message is transmitted and a time $t_4$ at which the ACK for the message is received. The master device 920 calculates a distance (D) to the electronic device 910 by using <Equation 1>, based on the time received from the electronic device 910.

$$D = c*((t_4 - t_1) - (t_3 - t_2))/2 \qquad \text{[Equation 1]}$$

Here, c is a speed of light.

The master device 920 may determine, based on the calculated distance, whether to register the electronic device 910 and may transmit at step 955 a result thereof to the electronic device 910.

A third method of registering an electronic device controllable by the master device is to perform registration in the master device directly from the electronic device by a user. For example, the user may store a zone, in which the user is located, in the electronic device and may directly perform registration by using a physical button of the electronic device. It may be possible to register the electronic device in the master device only when this operation is repeated for a certain time.

A master device having registered an electronic device according to at least one of the methods described above may additionally configure a zone. The user may directly configure, as the zone, a certain radius from the master device, otherwise the zone may be configured according to a predetermined value (default value). Alternatively, the master device may configure the zone by identifying a distance from another master device by using the Wi-Fi aware function or the 60 GHz Wi-Fi ranging function. In case of multiple master devices, zones may overlap each other. In this case, it may be a problem if the distance between master devices is closer than a predetermined value, wherein a simplest way to configure zones so as not to overlap with each other is halving the identified distance between each other. Alternatively, zones may be configured by configuring the identified distance between each other to ⅔ thereof, and in this case, the zones overlap each other. As another example, if the distance between master devices is too close, this fact may be notified to a user via speech.

According to the disclosure, the user may freely move between zones. Accordingly, if the user gives a speech command in a first zone and leaves the first zone to enter a second zone, there may be a problem.

As a method for solving this problem, an electronic device related to the speech command may directly respond to the user without going through the master device. For example, if the user commands to turn on a TV in the first zone, a master device in the first zone turns on the TV. The TV may directly notify the user that the TV is turned on.

In another method for solving the problem, although the speech command is received by the master device of the first zone, the master device of the first zone may transfer information related to the speech command to a master device of the second zone, so that the master device in the second zone may respond. That is, a handover between master devices may occur.

Figure 10:
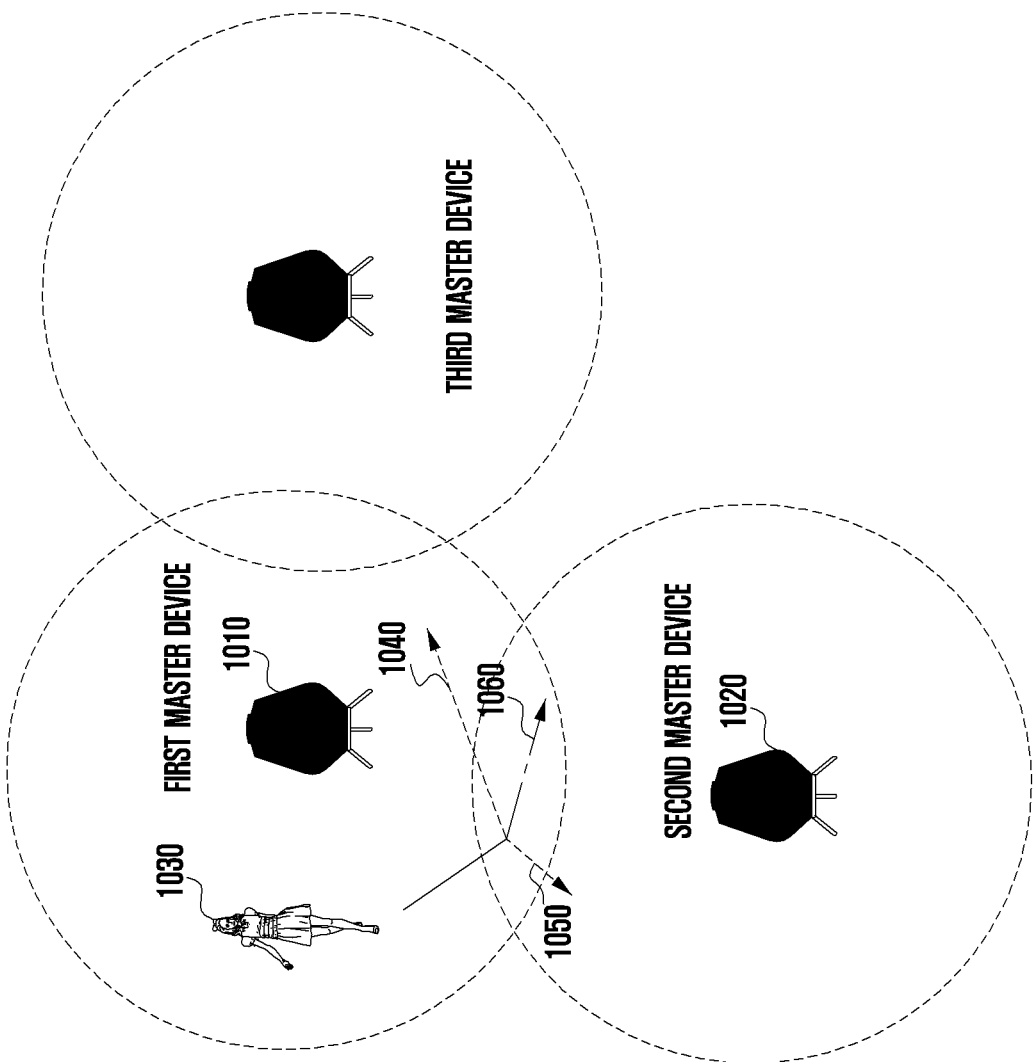
FIG. 10 is a diagram for illustrating a handover of a master device according to an embodiment of the disclosure.

FIG. 10 is a diagram for illustrating a handover between master devices according to an embodiment of the disclosure.

According to FIG. 10, each of three master devices has a zone of the same size, and some zones may overlap.

If the user 1030 is located in a zone of a first master device 1010, the first master device 1010 may track the user 1030. Later, if the user 1030 is located in an area, in which the zone of the first master device 1010 and a zone of a second master device 1020 overlap, the second master device 1020, in addition to the first master device 1010, may also track the user 1030.

If the user 1030 moves again in the direction of 1040 in the zone only for the first master device 1010, the first master device 1010 may track the user 1030, and the second master device 1020 may operate in the sensing mode.

Alternatively, if the user 1030 moves in the direction of 1050 to the zone only for the second master device 1020, the second master device 1020 may track the user 1030, and the first master device 1010 may operate in the sensing mode.

Alternatively, if the user 1030 moves in the direction of 1060 within an area in which the zone of the first master device 1010 and the zone of the second master device 1020 overlap, the first master device 1010, which is the master device of the zone where the user 1030 was located immediately before, may track the user 1030.

In another embodiment, if the user is located in an overlapping zone, a gesture of the user may not be recognized.

As another embodiment, if the user moves to a zone, the master device of the zone where the user first enters may provide information relating to an electronic device within the zone, etc. to a mobile terminal of the user.

Figure 11:
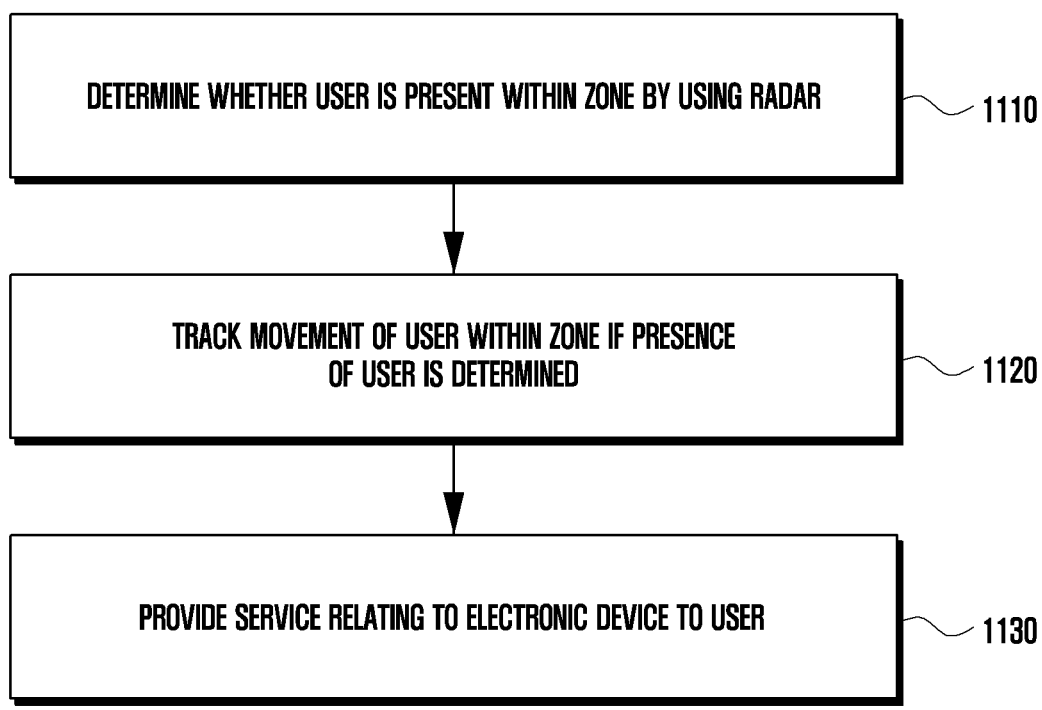
FIG. 11 is a flowchart illustrating a master device providing a service relating to an electronic device within a zone according to an embodiment of the disclosure.

FIG. 11 is a flowchart illustrating a master device providing a service relating to an electronic device within a zone according to an embodiment of the disclosure.

The master device may determine at step 1110 whether the user exists in the zone by using a radar. Specifically, the master device may determine whether the user exists, the distance to the user, and the like by identifying radar transmission/reception time, phase change, etc.

If it is determined that the user is present, the master device may track at step 1120 movement of the user within the zone.

The master device may provide at step 1130 a service relating to the electronic device to the user. The electronic device may be included in the zone so as to be controlled by the master device.

The service relating to the electronic device may be a service for providing of information relating to the electronic device when the user enters the zone or is located within a certain radius of the electronic device. The service relating to the electronic device may be a service performed by recognizing a specific gesture of the user as a command to the electronic device. Alternatively, the service relating to the electronic device may be a service in which an application related to the electronic device is executed using a mobile terminal carried by the user.

The master device may determine whether the user is out of the zone, and may transmit information relating to the user to another master device.

The master device may add a new electronic device as a device existing within the zone by using the Wi-Fi aware P2P function of the master device.

The zone may be configured to be within a certain radius of the master device, and if the zone overlaps a zone of another master device, the distance from the other master device may be identified and the zone may be configured based on the identified distance. The master device may identify the distance from the other master device by using a Wi-Fi aware function or a 60 GHz Wi-Fi ranging function.

According to an embodiment of the disclosure, a master device configured to provide a service relating to an electronic device within a zone may include a radar communication module, a short-range communication module, and a controller configured to determine whether a user is present within the zone by using the radar communication module, track movement of the user within the zone if the presence of the user is determined, and provide the user with the service relating to the electronic device, wherein the electronic device is included in the zone so as to be controlled by the master device.

According to an embodiment of the disclosure, the service of the master device, which relates to the electronic device, may be a service to provide information relating to the electronic device when the user enters the zone or is located within a certain radius of the electronic device.

According to an embodiment of the disclosure, the service of the master device, which relates to the electronic device, may be a service performed by recognizing a specific gesture of the user as a command for the electronic device.

According to an embodiment of the disclosure, the service of the master device, which relates to the electronic device, may be a service in which an application related to the electronic device is executed using a mobile terminal carried by the user.

According to an embodiment of the disclosure, the controller of the master device may determine whether the user is out of the zone, and may transmit information relating to the user to another master device.

According to an embodiment of the disclosure, the controller of the master device may add a new electronic device as a device existing within the zone.

According to an embodiment of the disclosure, the controller of the master device may add the new electronic device by using a Wi-Fi aware P2P function of the master device.

According to an embodiment of the disclosure, the zone of the master device may be configured to be within a certain radius of the master device.

According to an embodiment of the disclosure, the controller of the master device may, if the zone overlaps a zone of another master device, identify a distance from the other master device and may configure the zone on the basis of the identified distance.

According to an embodiment of the disclosure, the controller of the master device may identify the distance from the other master device by using a Wi-Fi aware function or a 60 GHz Wi-Fi ranging function.

According to an embodiment of the disclosure, a method for providing a service relating to an electronic device by using a master device within a zone may include determining whether a user is present within the zone by using radar, tracking movement of the user within the zone if the presence of the user is determined, and providing the user with the service relating to the electronic device, wherein the electronic device is included in the zone so as to be controlled by the master device.

In the method for providing the service relating to the electronic device according to an embodiment of the disclosure, the service relating to the electronic device may be a service to provide information relating to the electronic device when the user enters the zone or is located within a certain radius of the electronic device.

In the method for providing the service relating to the electronic device according to an embodiment of the disclosure, the service relating to the electronic device may be a service performed by recognizing a specific gesture of the user as a command for the electronic device.

In the method for providing the service relating to the electronic device according to an embodiment of the disclosure, the service relating to the electronic device may be a service in which an application related to the electronic device is executed using a mobile terminal carried by the user.

The method for providing the service relating to the electronic device according to an embodiment of the disclosure may further include determining whether the user is out of the zone, and transmitting information relating to the user to another master device.

The method for providing the service relating to the electronic device according to an embodiment of the disclosure may further include adding a new electronic device as a device existing within the zone.

In the method for providing the service relating to the electronic device according to an embodiment of the disclosure, the adding of the new electronic device may include adding the new electronic device by using a Wi-Fi aware P2P function of the master device.

In the method for providing the service relating to the electronic device according to an embodiment of the disclosure, the zone may be configured to be within a certain radius of the master device.

The method for providing the service relating to the electronic device according to an embodiment of the disclosure may include, if the zone overlaps a zone of another master device, identifying a distance from the other master device and configuring the zone on the basis of the identified distance.

In the method for providing the service relating to the electronic device according to an embodiment of the disclosure, the distance from the other master device may be identified using a Wi-Fi aware function or a 60 GHz Wi-Fi ranging function.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A master device configured to provide a service relating to an electronic device within a zone, the master device comprising:
 a radar communication module;
 a short-range communication module;
 memory storing instructions; and
 at least one processor comprising processing circuitry
 wherein the instructions, when individually or collectively executed by at least one processor, cause the master device to:
  determine whether a user is present within the zone by using the radar communication module,
  track a movement of the user within the zone if the user present within the zone,
  determine whether user gestures are recognized,
  control a function of electronic devices within the zone based on the recognized user gestures,
  determine whether the user is within an overlapping zone, and
  refrain from recognizing user gestures based on confirmation that the user's location is within an overlapping zone,
 wherein the overlapping zone is an area where the control areas of two or more master devices intersect.

2. The master device of claim 1, wherein the service relating to the electronic device is a service to provide information relating to the electronic device when the user enters the zone or is located within a certain radius of the electronic device.

3. The master device of claim 1, wherein the service relating to the electronic device is a service performed by recognizing a specific gesture of the user as a command for the electronic device.

4. The master device of claim 1, wherein the service relating to the electronic device is a service in which an application related to the electronic device is executed using a mobile terminal carried by the user.

5. The master device of claim 1, wherein the at least one processor is configured to determine whether the user is out of the zone, and transmit information relating to the user to another master device.

6. The master device of claim 1, wherein the at least one processor is configured to add a new electronic device as a device existing within the zone.

7. The master device of claim 6, wherein the at least one processor is configured to add the new electronic device by using a Wi-Fi aware P2P function of the master device.

8. The master device of claim 1, wherein the zone is configured to be within a certain radius of the master device.

9. The master device of claim 8, wherein the at least one processor is configured to, if the zone overlaps a zone of another master device, identify a distance from the other master device, and configure the zone on the basis of the identified distance.

10. The master device of claim 9, wherein the at least one processor is configured to identify the distance from the other master device by using a Wi-Fi aware function or a 60 GHz Wi-Fi ranging function.

11. A method for providing a service relating to an electronic device by using a master device within a zone, the method comprising:
   determining whether a user is present within the zone by using radar;
   tracking a movement of the user if the user is present within the zone;
   determining whether user gestures are recognized;
   controlling a function of electronic devices based on the recognized user gestures;
   determining whether the user is within an overlapping zone; and
   refraining from recognizing user gestures based on confirmation that the user's location is within an overlapping zone,
   wherein the overlapping zone is an area where the control areas of two or more master devices intersect.

12. The method of claim 11, wherein the service relating to the electronic device is a service to provide information relating to the electronic device when the user enters the zone or is located within a certain radius of the electronic device.

13. The method of claim 11, wherein the service relating to the electronic device is a service performed by recognizing a specific gesture of the user as a command for the electronic device.

14. The method of claim 11, wherein the service relating to the electronic device is a service in which an application related to the electronic device is executed using a mobile terminal carried by the user.

15. The method of claim 11, further comprising:
   determining whether the user is out of the zone; and
   transmitting information relating to the user to another master device.

16. The method of claim 11, further comprising adding a new electronic device as a device existing within the zone.

17. The method of claim 16, further comprising adding the new electronic device by using a Wi-Fi aware P2P function of the master device.

18. The method of claim 11, wherein the zone is configured to be within a certain radius of the master device.

19. The method of claim 11, further comprising, when the zone overlaps a zone of another master device, identifying a distance from the other master device, and configuring the zone on the basis of the identified distance.

20. The method of claim 19, further comprising identifying the distance from the other master device by using a Wi-Fi aware function or a 60 GHz Wi-Fi ranging function.

* * * * *